H. N. ARMSTRONG.
STOP WASHER FOR NUTS.
No. 48,353. Patented June 27. 1865.
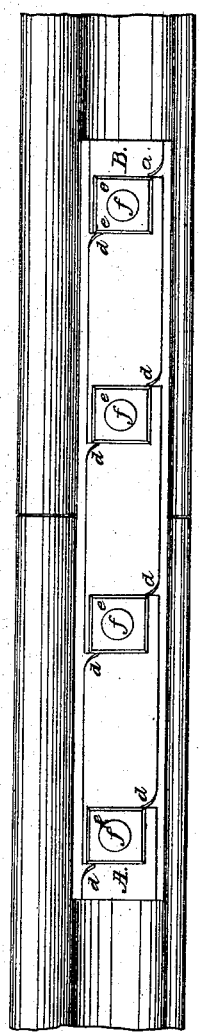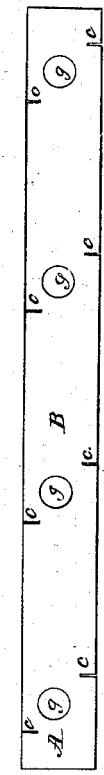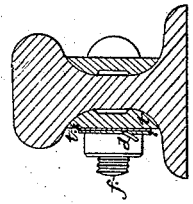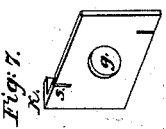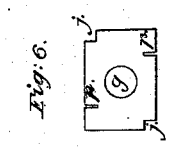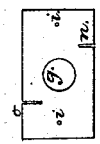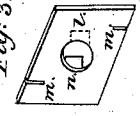

UNITED STATES PATENT OFFICE.

H. N. ARMSTRONG, OF ERIE, PENNSYLVANIA.

IMPROVED STOP-WASHER FOR NUTS.

Specification forming part of Letters Patent No. 48,353, dated June 27, 1865.

*To all whom it may concern:*

Be it known that I, H. N. ARMSTRONG, of Erie, in the county of Erie and State of Pennsylvania, have invented a new and useful Stop-Washer; and I do hereby declare that the following is a clear, full, and exact description of the construction and operation of the same, reference being had to the annexed drawings, making a part of this specification, in which—

Figure 1 is a perspective view of the long manifold washer when applied and in place on a railroad-rail joint; Fig. 5, a cross-section of the same; Fig. 2, the long washer cut and punched ready for application; Figs. 3, 4, 6, and 7, single washers with different devices to prevent them from turning back.

The washer is constructed out of sheet metal by cutting it about one-fourth off on both edges, as at $c$ and $c$, Fig. 2, and $o$ and $n$, Fig. 4. These cuts are on lines at right angles to the edges, and the distance between these lines is equal to the width of the nut. After the nut is put in place and tightened up the outer corners of the washer at the cuts are turned up at an angle of about forty-five degrees, as represented at $d$, Figs. 1 and 5. This portion of the washer then forms a brace to prevent the nut from turning back. The nut can more readily be brought square with the washer because of the india-rubber washer $tt$, Fig. 5, under the iron washer.

$ee$, &c., Fig. 1, represent the nuts; $f$, Figs. 1 and 5, the bolts; $g$, Figs. 2, 4, 6, and 7, bolt-holes.

The washer is prevented from being forced back by extending it to more than one bolt, as represented in Figs. 1 and 2.

The other modes of applying my invention are represented in Figs. 3, 4, 6, and 7. In Fig. 3 the washer is held in place by not punching bolt-holes, but cutting the washer in the center and turning the metal inward to catch on the wood or iron back of the washer. In Fig. 4 the washer is held in place, especially when used over wood, by nails in the holes $ii$. The washer of the form represented in Fig. 6 is held in place by turning the corners $jj$ down to catch on the wood or iron back of it. The washer is prevented from turning, as represented in Fig. 7, by turning the end $k$ down over the wood or iron back of the washer. The cuts $mn$, Fig. 3, $no$, Fig. 6, and $rs$, Fig. 7, are the same as $c$, Fig. 2.

To tighten the nuts after use the corners of the washers are bent down and turned up again after the nut is tightened; or with steel washers the corners spring to their places.

What I claim as my invention, and desire to secure by Letters Patent, is—

Cutting the edges of the fixed washer and turning up the corners thus formed to hold the nut from being forced back on its thread.

H. N. ARMSTRONG.

Witnesses:
J. W. WETMORE,
E. B. BENNETT.